United States Patent [19]

McMaster

[11] Patent Number: 4,517,001
[45] Date of Patent: May 14, 1985

[54] APPARATUS FOR BENDING GLASS SHEETS

[75] Inventor: Ronald A. McMaster, Woodville, Ohio

[73] Assignee: Glasstech, Inc., Perrysburg, Ohio

[21] Appl. No.: 590,770

[22] Filed: Mar. 19, 1984

[51] Int. Cl.³ .................... C03B 23/033; C03B 35/14
[52] U.S. Cl. ........................................ 65/273; 65/104; 65/287; 65/291
[58] Field of Search ................. 65/104, 106, 107, 273, 65/287, 291, 114

[56] References Cited

U.S. PATENT DOCUMENTS 3,607,187  9/1971  McMaster ............................ 65/106
4,437,871  3/1984  McMaster et al. ................... 65/104

Primary Examiner—Arthur Kellogg
Attorney, Agent, or Firm—Brooks & Kushman

[57] ABSTRACT

Sheet glass is heated during conveyance on a conveyor within a furnace. A vacuum holder is horizontally movable within the furnace immediately above the conveyor in close proximity to the heated glass sheet. The holder has a downwardly facing surface with spaced openings in which a vacuum is drawn to receive the heated glass sheet from the conveyor, support the sheet above the conveyor, move the heated glass sheet horizontally along the longitudinal axis of the furnace and drop the heated glass sheet onto a carrier mold ring positioned within the furnace by removing the vacuum so that the glass sheet bends under the force of gravity in a manner that allows the heated glass sheet to be accurately bent. In a preferred embodiment the mold ring subsequently is removed from the furnace to a quench unit that tempers the bent glass.

15 Claims, 10 Drawing Figures

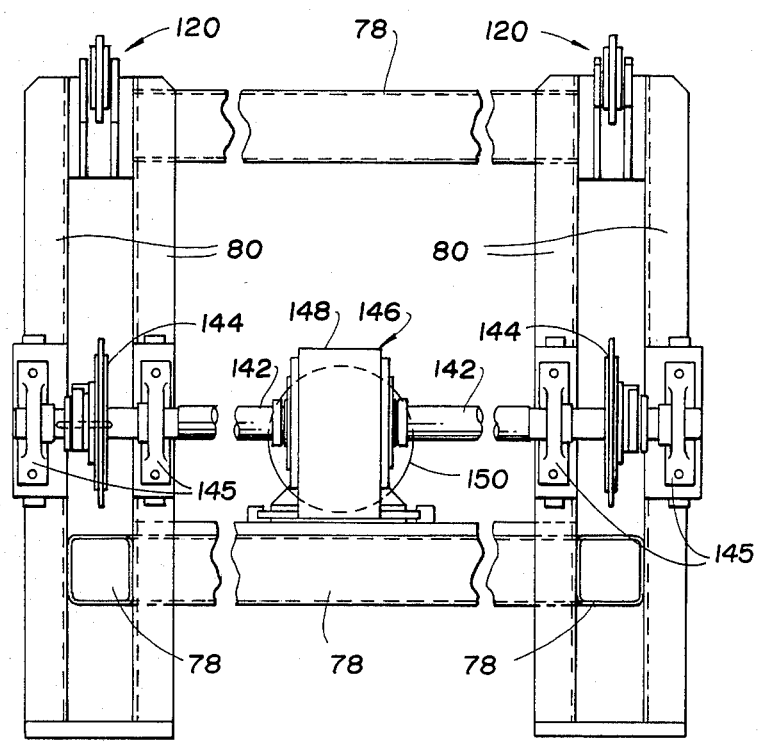
Fig. 8
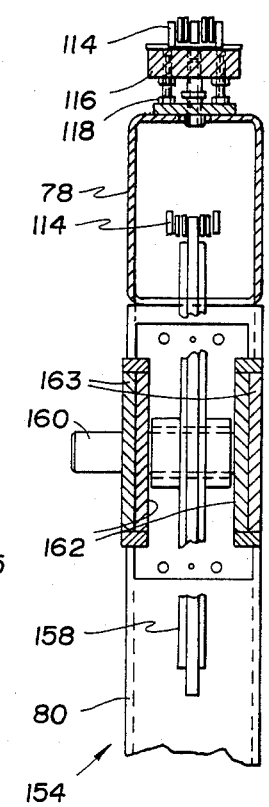
Fig. 9
Fig. 10
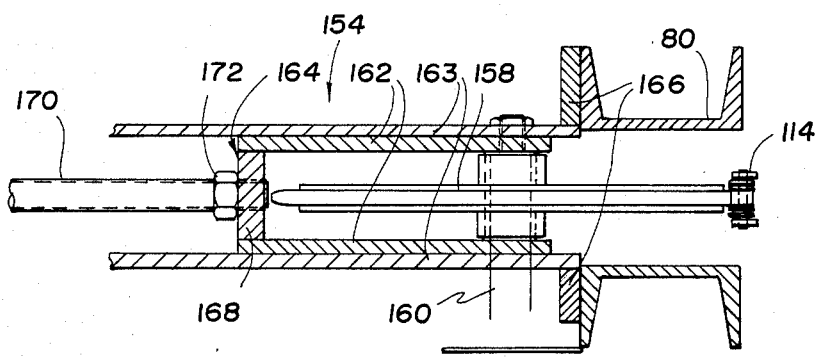

APPARATUS FOR BENDING GLASS SHEETS

TECHNICAL FIELD

This invention relates to apparatus for bending sheet glass.

BACKGROUND ART

Bent glass is used extensively for vehicle side and rear windows and also for vehicle lights. Such bent glass is also frequently tempered so that the glass not only has an aesthetically appealing shape that compliments the design of the vehicle, but also provides a good resistance to breakage.

In order to perform such bending, the glass sheet must be heated to its deformation point of about 1,200° to 1,300° F. and then bent to the required shape. If tempering is desired the bent glass sheet is typically rapidly cooled by an air spray. Various United States patents disclose apparatus for bending and tempering glass sheets with press benders having shaped surfaces between which heated glass is clamped to shape it prior to being air cooled by a quench unit. For example, U.S. Pat. Nos. 3,454,389; 3,476,542; 3,488,178; 3,600,150; and 3,951,634 disclose such press bending and tempering apparatus.

Other United States patents disclose apparatus for heating glass sheets prior to bending and tempering thereof on fluid support beds as the glass is conveyed through the furnace. Such apparatus is disclosed in the U.S. Pat. Nos. 3,497,340, 3,607,187 and 3,607,200. Normally the support bed is inclined slightly with respect to the horizontal so that gravity engages an edge of the glass with a movable frame that provides the impetus for glass movement along the bed. There is no contact between the bed and the oppositely facing surfaces of the glass during the conveyance as the glass is heated. This lack of contact prevents marring and scratching of the soft surfaces of the glass as the glass reaches its deformation temperature. However, there is normally mechanical contact with the glass during the bending after the heating in preparation for a cooling quench that tempers the glass in its bent condition.

Vacuum forming of heated glass sheets is disclosed by U.S. Pat. No. 3,778,244 wherein the sheet glass is first heated during conveyance along a roller hearth conveyor. After heating a lifter with a curved downwardly facing surface has a vacuum applied thereto along the surface to shape the glass. After shaping against the curved surface of the lifter the vacuum is terminated to drop the glass onto a mold for conveyance to a waiting operator who removes the glass from the mold.

U.S. Pat. Nos. 4,282,026 and 4,297,118 discloses an apparatus for conveying sheet glass along a substantially horizontal path which extends through a tunnel-type furnace where a series of sheets are heated to the deformation temperature of the glass and along an extension of the path into a shaping station where each glass sheet is in turn transferred onto a vacuum mold. The vacuum mold lifts and holds the heat-softened glass sheet by suction. At about the same time a carrier mold ring, having an outline shape conforming to that desired for the glass sheet moves into a position below the vacuum mold. Release of the vacuum deposits the glass sheet onto the tempering ring. The tempering ring supports the glass sheet while it conveys the glass sheet into a cooling station for rapid cooling.

In the U.S. Pat. No. 4,282,026 vertical movement of the vacuum holder or, alternatively, auxiliary lifters positioned between the conveyor rolls lifts the sheet of glass upwardly in spaced relationship to the conveyor rolls.

In the U.S. Pat. No. 4,297,118 the apparatus includes an upper vacuum mold which first engages and lifts a heat-softened glass sheet by suction which provides clearance for a shaping and tempering ring to enter the shaping station. The vacuum mold is thereafter moved outside the furnace during successive bending operations.

The U.S. Pat. No. 3,607,187 discloses a vacuum mold which lifts softened glass sheets by first being lowered toward the sheet and applying suction through a downwardly facing permanently curved shaping surface. The vacuum mold is thereafter moved horizontally over the conveyor belt from the shaping station beyond an enclosed heating furnace to a cooling station. The mold redeposits the glass sheet onto a conveyor belt at a cooling station.

DISCLOSURE OF THE INVENTION

An object of the present invention is to provide improved apparatus capable of bending thin glass sheets at relatively high production rates while providing accurate control of the shape to which the glass is bent.

Another object of the present invention is to provide improved apparatus capable of bending glass sheets at relatively high production rates while at the same time minimizing the cost of the apparatus.

In carrying out the above objects and other objects of this invention, the apparatus of the invention includes a furnace for providing a heated ambient for heating the glass sheets to a sufficiently high temperature for bending thereof. A conveyor conveys the glass sheets through the heated ambient. A holder having a downwardly facing planar surface is spaced immediately above the conveyor in close proximity to the heated glass sheet conveyed under the holder. Means are provided for applying a differential gas pressure to the heated glass sheets to provide support thereof against the holder surface. A curved mold is movable into the heated ambient to a first position at an elevation below the holder surface and thereafter movable to a second position out of the heated ambient. Means are also provided for horizontally moving the holder within the heated ambient from above the conveyor to above the mold while the mold is in the first position whereupon the differential gas pressure is terminated to release the heated glass sheet onto the mold for bending by gravity. An actuator moves the mold with the glass sheet thereon from the first position to the second position for cooling.

Preferably, the curved mold is supported on arms that extend into the furnace at one end thereof. The ring is thereafter moved through a quench unit positioned adjacent the end of the furnace. Movement of the mold ring with the bent glass thereon into the quench unit between upper and lower blastheads thereof provides tempering of the glass. Air flow through nozzles of the blastheads cools the heated glass rapidly as the tempering takes place to decrease its resistance to breakage. Thereafter the glass is transferred from the curved mold into a cooler which is preferably in line with the furnace for additional cooling before being packed. The curved mold returns to the furnace to receive additional softened glass sheets which in the meantime, have been lifted by the holder and horizontally moved to the first position of the curved mold to begin another cycle.

Also preferably, the holder is spaced immediately above the conveyor in close proximity to the heated glass sheet to minimize the amount of power needed to obtain the suction necessary to lift the heated glass sheet. The close proximity of the holder to the heated glass sheet also is advantageous to the high speed mass production operation of thin glass sheet in that the vacuum holder is neither lifted nor dropped, but rather merely moves in a generally horizontal direction. Also, since the shaping of the thin glass sheets is within the furnace, energy is saved because there is no need to overheat the glass which rapidly cools when moved to a shaping station outside the furnace.

Also, preferably, the vacuum holder is permanently installed within the furnace in a position with respect to a heated glass sheet which is adjustable. Routine maintenance of the vacuum holder is relatively easy by a simple disconnection of a vacuum line to the holder and the removal of drive members from the vacuum holder.

The objects, features, and advantages of the present invention are readily apparent from the following description of the best mode for carrying out the invention taken in connection with the accompanying drawings.

BRIEF DESCRIPTION OF THE DRAWINGS

FIG. 8 is an end view, partially broken away of a synchronizing member for driving the drive mechanism;

FIG. 9 is an end view, partially broken away and in cross section of a portion of a take-up assembly for the drive mechanism; and FIG. 10 is a side elevational view, partially broken away and in cross section of the take-up assembly of FIG. 9.

BEST MODE FOR CARRYING OUT THE INVENTION

Figure 1:
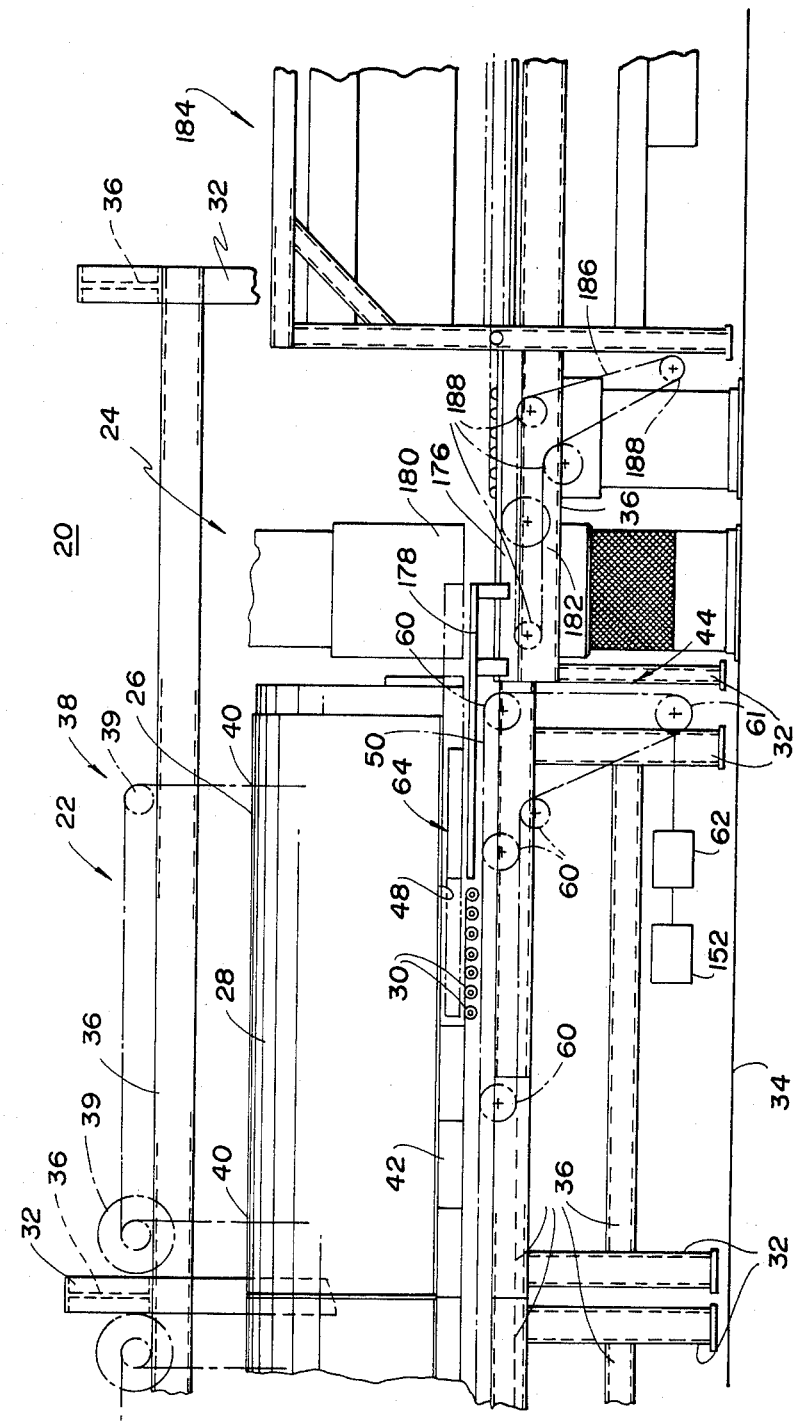
FIG. 1 is a schematic side elevational view, partially broken away showing a glass bending and tempering apparatus constructed according to the present invention.

Referring to FIG. 1 of the drawings, an embodiment of a glass bending and tempering apparatus constructed according to the present invention is indicated collectively by 20 and includes a furnace 22 and a quench unit 24. One end of the furnace 22 (not shown) receives discrete sheets of glass to be bent and tempered while the other end 26 has provisions for bending the glass once it is heated in a manner that is hereinafter described.

The quench unit 24 is positioned adjacent and in line with the furnace end 26 and receives the heated and bent glass to provide tempering thereof in a manner that is likewise hereinafter described. It is also possible for the quench unit 24 to be positioned on either side of the furnace end 26 as well as at its longitudinal end as shown in FIG. 1.

The furnace 22 in which sheet glass is heated includes a housing comprising an upper portion 28 and a lower portion (not shown). The upper housing portion 28 has a semi-circular configuration mounted for vertical movement. At its lower closed position, as shown in FIG. 1 the upper housing portion 28 is located immediately over its associated lower housing portion and thereby closes the interior of the furnace to prevent the escape of heat. In its upper position the upper housing portion 28 provides access to the interior of the furnace 22 from either elongated side of the furnace 22 for removal of broken glass therefrom or the replacement of rolls or rollers 30 on which sheets of glass are conveyed through the furnace 22 from left to right as viewed in FIG. 1.

A supporting framework for the furnace 22 and the rest of the bending and tempering system includes a plurality of vertical support beams 32 which extend upwardly from the floor 34 as well as a plurality of horizontal crossbeams 36 which provide an upper support structure above the furnace 22.

The upper housing portion 28 is moved between its lower closed position and its upper open position by a pulley system generally indicated at 38. The pulley system 38 includes pulleys 39 and two pairs of chains 40 associated with each end of the upper housing portion 28 thus making a total of four chains for the upper housing portion 28. A pulley system generally of the type to which this invention relates is shown in the United States Patent to McMaster et al U.S. Pat. No. 3,947,242 which is hereby incorporated by reference.

While not shown, the roof of the upper housing portion 28 (as well as the interior surface of the lower housing portion) includes T-shaped retainers and heater elements secured thereby. Together, the upper and lower housing portions define a heating chamber 42 therebetween.

Figure 4:
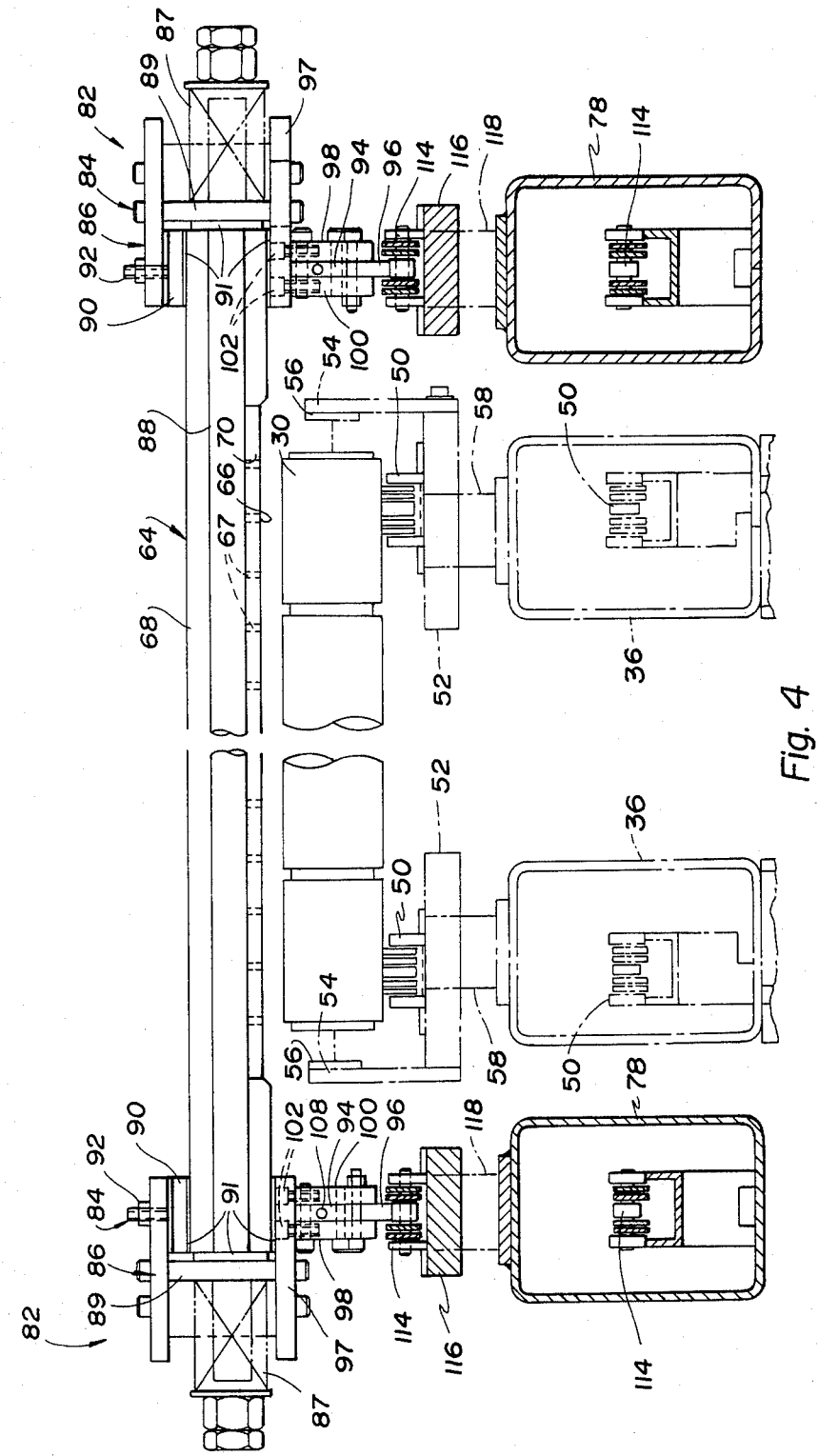
FIG. 4 is an end view, partially broken away and in cross section of a vacuum holder and its associated carriage and drive mechanism.
Figure 5:
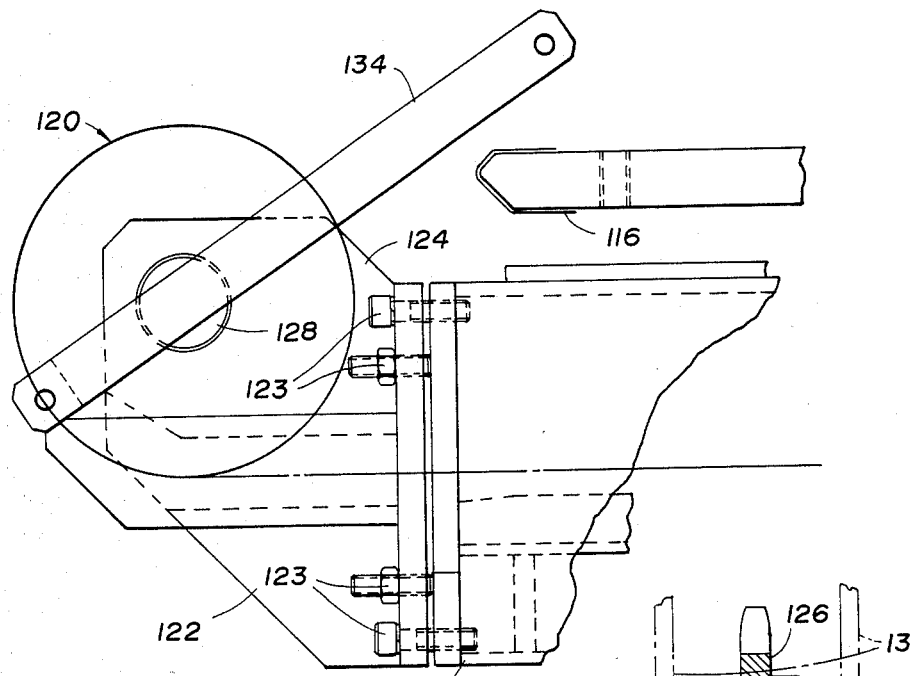
FIG. 5 is an enlarged, partially broken away view of a portion of the drive mechanism, disassembled from its associated carriage.

A conveyor of the apparatus is indicated generally by reference numeral 44 and includes a plurality of the conveyor rolls 30 which are made from silica particles that are sinter-bonded to each other. The ends of each conveyor roll 30 extends outwardly through side slots 48 lying between the upper and lower housing portions. Continuous drive loops 50 formed of chains or solid steel belts are slidably driven over upwardly-facing support surfaces of members 52 to frictionally drive the rolls 30 at their ends thereof as best shown in FIG. 4.

Each roll end is positioned between upwardly extending projections 54 which support idler rollers 56 which, in turn, rotatably support the ends of the rolls 30 for preventing movement of the rolls 30 along with the drive loops 50. Supports 58 support the surface members 52 on the horizontal beam 36, as shown in FIG. 4, to maintain planarity of the upper sides of all of the rolls 30.

On the horizontal beams 36 which mount the support surface members 52, pulleys 60 are rotatably mounted and the associated drive loops 50 are trained thereover.

The loops 50 are also trained over drive pulleys 61 which are interconnected at the end of the conveyor 44 by a cross-shaft (not shown) which is driven by a drive mechanism 62. The drive mechanism 62 comprises a digital drive motor such as an electric stepper motor and a chain to pull the drive loops 50 over the support surfaces 52 and thereby frictionally drive the adjacent roll ends. U.S. Pat. Nos. 3,806,312, 3,934,970, 3,947,242 and 3,994,711 disclose such frictional roll drive mechanism and the entire disclosures are hereby incorporated by reference.

Figure 2:
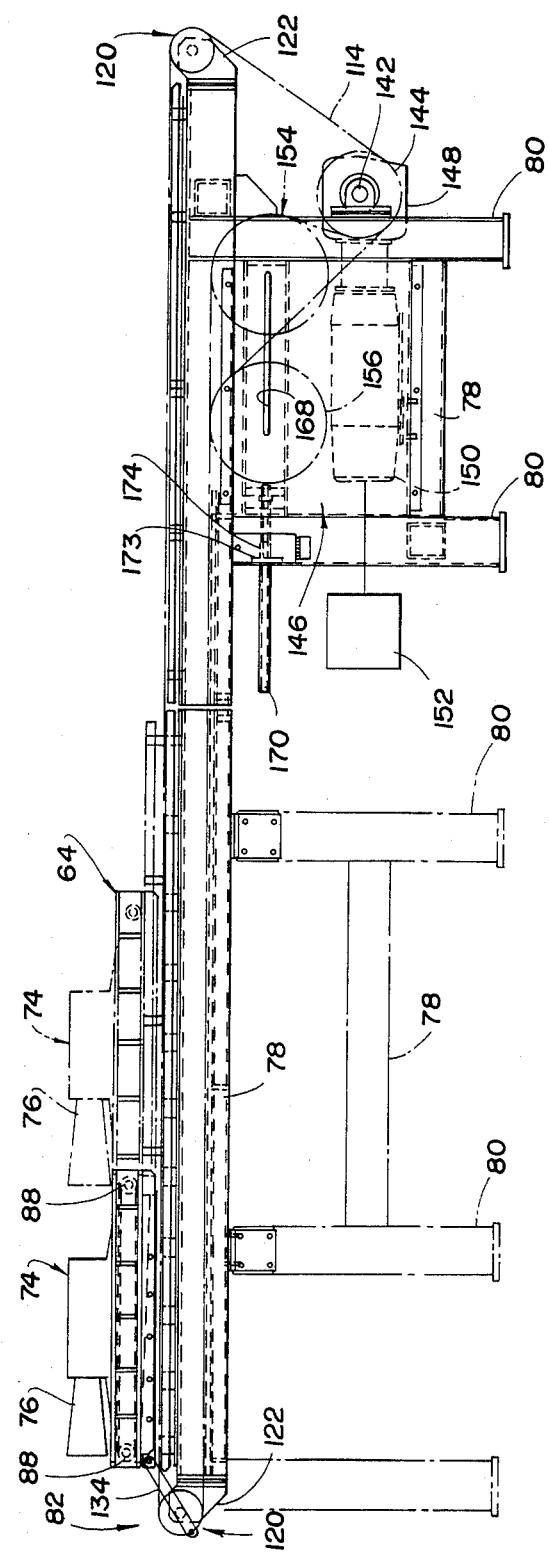
FIG. 2 is a schematic side elevational view of a vacuum mold and its associated drive assembly shown in one of its operative positions by solid lines and in another one of its positions by phantom lines.
Figure 3:
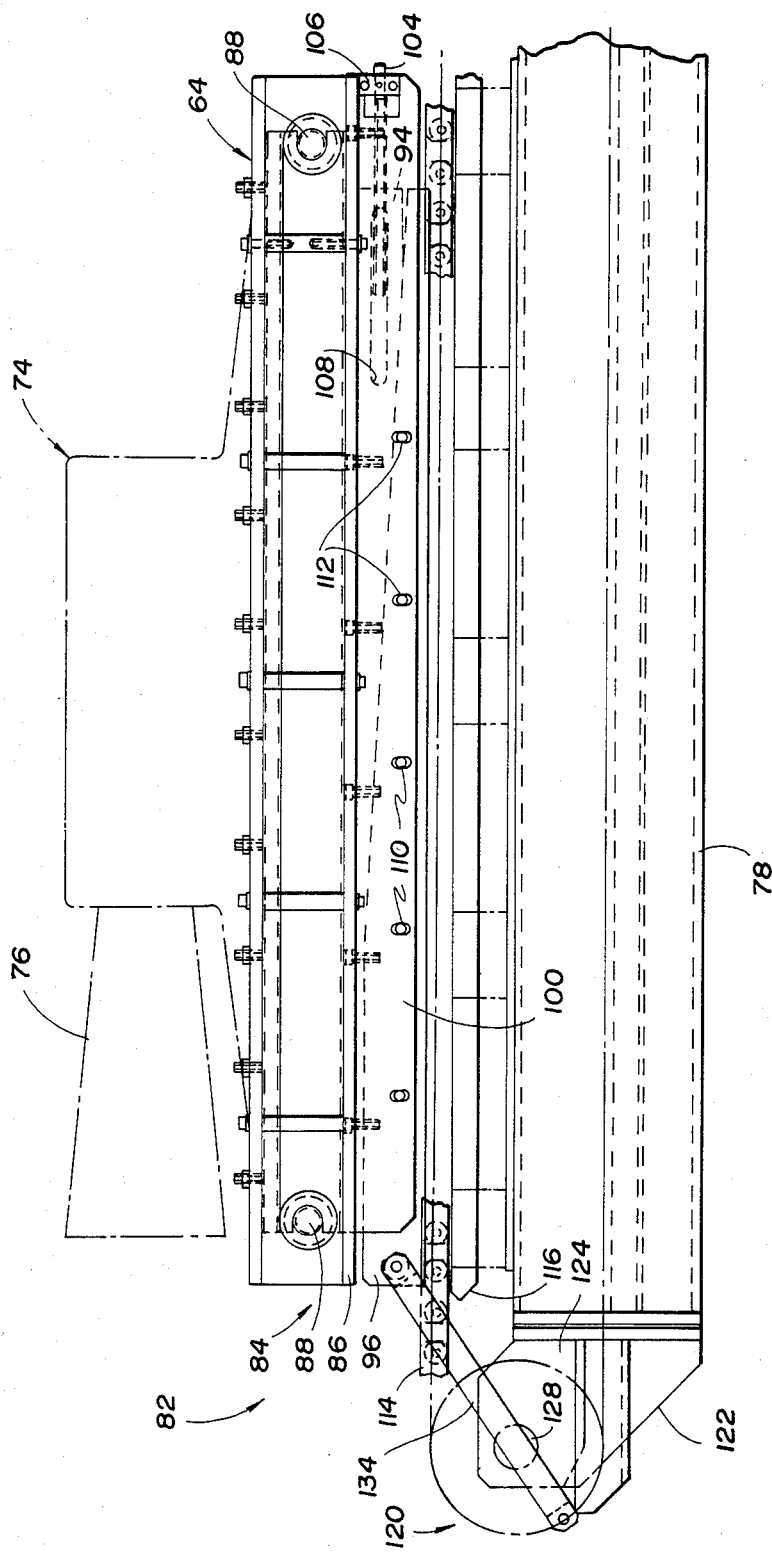
FIG. 3 is an enlarged, partially broken away view illustrating the construction of the carriage of the vacuum holder.

As seen in FIGS. 2, 3 and 4, a vacuum platen or holder 64 of the apparatus is mounted within the furnace heating chamber 42 for movement horizontally within the heating chamber 42 along the longitudinal axis of the furnace 22. The holder 64 is movable along the heating chamber 42 to the end 26 of the furnace 22 adjacent the quench unit 24.

As best shown in FIG. 4, the holder 64 has a downwardly facing planar surface 66. Preferably, a sheet-like cover made of ceramic fibers, preferably silica and/or alumina, which are compressed into a mat that has a porous construction is positioned on the planar surface 66. The cover is secured to the holder 64 such as by a high-temperature adhesive. Aligned openings or holes 67 extend into the holder 64 from its lower surface 66 to a cavity defined by upper and lower portions 68 and 70, respectively of the holder 64.

The cover prevents marring or scratching of the soft glass surface as the glass sheet is engaged with the holder 64 and due to its porous construction distributes the vacuum between the holes in the lower portion 70 of the holder 64.

A vacuum is drawn within the cavity within the holder 64 by a gas jet pump generally indicated at 74. The jet pump 74 includes a funnel-shaped conduit 76 to facilitate the flow through the pump 74. The jet pump 74 is connected to the holder 64 to supply positive pressure and/or vacuum pressure to the holder 64. The gas jet pump is supplied with compressed air through a group of supply lines, compressor and/or pump. The construction and operation of a gas jet pump of this type is generally disclosed in U.S. Pat. No. 4,222,763 which is hereby incorporated by reference.

The holder 64 is supported and mounted on a framework of horizontal and vertical beams 78 and 80, respectively, as best shown in FIG. 2. A drive mechanism for the holder 64 is generally indicated at 82 as shown in FIGS. 2, 3 and 4. As seen in FIG. 4, the drive mechanism 82 is mounted on both sides of the furnace 22 outside of the heating chamber 42 and outside of the beams 36. The drive mechanism 82 includes a carriage or shuttle assembly, generally indicated at 84. The carriage assembly 84 includes a pair of elongated H-shaped mounting members generally indicated at 86 for laterally supporting the holder 64 at opposite sides of the furnace 22. The holder 64 is supported within the members 86 by pairs of cross-shafts 88 at its forward and rearward ends which extend through cross members 89 of the mounting members 86. Spacers 87 space the ends of the cross-shafts 88 from the cross members 89.

The holder 64 is also supported within the member 86 at its ends thereof by spacers 90 held in engagement against the holder 64 by mounting bolts 92. Pieces of felt 91 surround the sides of the holder 64 within the members 86 to further support the holder 64 therewithin.

Upper and lower wedge members 94 and 96, respectively, of the assembly 84 extend downwardly from the lower arm 97 of the H-shaped members 86 between spaced and generally parallel inner and outer side walls 98 and 100, respectively. The angled surfaces of the wedge members 94 and 96 engage each other. The inner and outer side walls 98 and 100 are bolted to the arm 97 by bolts 102. The relative horizontal positions and, consequently the relative vertical positions between each pair of upper and lower wedge members 94 and 96, respectively, are controlled by a threaded bolt 104 mounted between the inner and outer walls 98 and 100 by a mounting bracket 106 which, in turn, is mounted on the lower arm 97, as seen in FIG. 3. The threaded end of the bolt 104 extends into a threaded bore 108 which extends into the upper wedge member 94. Rotation of the bolt 104 alternatively moves the upper wedge member 94 either towards or away from the mounting bracket 106. Relative movement of the upper wedge member 94 causes the lower wedge member 96 to alternately move upwardly or downwardly with respect to the lower arm 97. The lower wedge member 96 is held between the inner and outer side walls 98 and 100 by pins 110 which are allowed to move within slots 112 formed in the side walls 100 and 98.

The lower wedge members 96 are urged upwardly against the upper wedge members 94 in that the lower wedge members 96 ride upon drive loops 114. The continuous drive loops 114 are in the form of chains or solid steel belts which are slidably driven over upwardly facing support surface members 116 which also extend alongside the side slots 48 and are further removed from the heating chamber 42. Support members 118 support the members 116 on the horizontal beam 78 to maintain planarity of the lower sides of the lower wedge members 96. The bottom wedge members 96 and, consequently, the entire assembly 82 ride along with the drive loops 114 as is described in greater detail hereinbelow.

At each end of the horizontal beams 78 mounting the support surface members 116 are rotatable pulleys 120 mounted by means of mounting brackets 122 which are bolted to the beams by bolts 123. In turn, the brackets 122 are fixedly connected to pulley support plates 124 by bolts 125. Pulleys 120 are rotatably mounted on the plates 124. Each pulley 120 includes a sprocket 126 rotatably mounted on a roller pin 128 by means of bearings 130. The roller pin 128 is held between and bolted to spaced apart arms 132 fixedly mounted to the plate 124.

Figure 6:
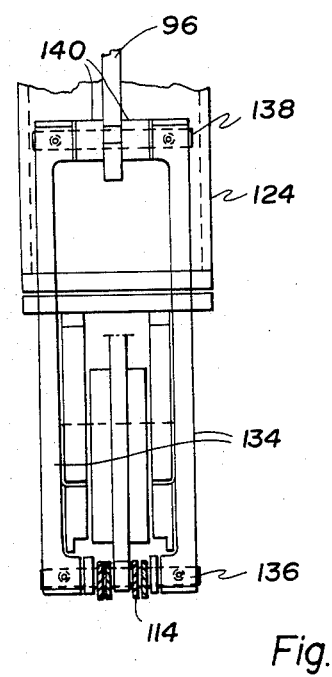
FIG. 6 is an end view, partially broken away and in cross section of the drive mechanism of FIG. 3.
Figure 7:
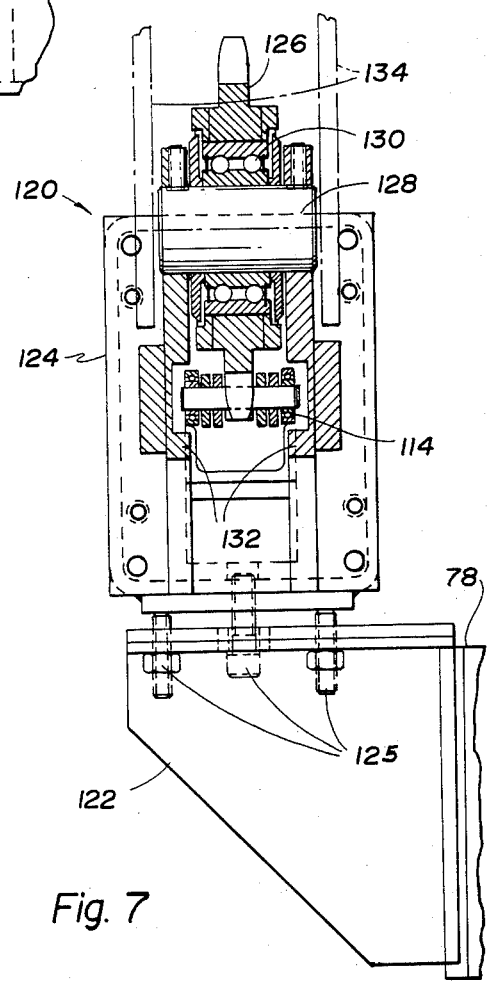
FIG. 7 is an end view, partially broken away and in cross section of the drive mechanism of FIG. 5.

At a preselected point on each drive loop 114, a pair of drive links 134 are pivotally connected by means of a pivot pin 136 as best shown in FIG. 6. The opposite ends of the drive links 134 are pivotally connected to the lower wedge member 96 also by a pivot pin 138. Ends of the drive links connected to the lower wedge member 96 are spaced apart from the lower wedge member 96 by a pair of spacers 140 to center the lower wedge member 96 therebetween. In this way movement of the drive loops 114 over their respective sprockets 126 causes the drive members 134 to alternately push or pull the carriage assembly 84 which rides on the drive loops 114. In this way the holder 64 is moved horizontally in the furnace 22 along the longitudinal axis of the furnace 22.

Referring now to FIG. 8, at one end of the drive mechanism 82 a pair of drive shafts 142 are drivingly connected to a pair of drive pulleys 144. The drive shafts 142 are rotatably mounted on the vertical beams 80 by holders 145 which are fixedly mounted to the beams 80.

A motor mechanism 146 drives the shafts 142 and the pulleys 144 thereby pulling the drive loops 114 over the support surfaces 116. The motor mechanism 146 includes a synchronized hub 148 which is driven by a drive motor such as an electric motor 150. In turn, the motor 150 is controlled by a controller 152 which also controls the drive mechanism 62 as shown in FIG. 1. The controller 152 may comprise a programmed computer controller to synchronize the speed of horizontal movement of the holder 64 within the heated ambient with the speed of the conveyed glass sheet such that there is no relative horizontal movement between the holder 64 and the heated glass sheets as the glass sheets are received by the holder 64 from the conveyor 144.

Referring now to FIGS. 2, 9 and 10, there is illustrated at 154 at take-up assembly. Each take-up assembly 154 adjusts the tension in its associated drive loop 114. The take-up assembly 154 includes an idler pulley 156 which includes a sprocket 158 which is rotatably mounted on a roll pin 160. The roll pin 160, in turn, is mounted between the side plates 162 of a slide member generally indicated at 164. The slide member 162 is adjustably and slidably mounted between a pair of side plates 163 which are fixedly mounted to a vertical beam 80 by a pair of plates 166 such as by welding. The side plates 163 include elongated slots 168 which extend therethrough to permit the adjustment of the slide member 164 between the side plates 163 as best seen in FIG. 2.

A bottom member 168 of the slide member 164 is fixedly connected to a threaded rod 170 and secured thereto by a nut 172. As seen in FIG. 2, the threaded rod 170 extends through a vertical beam 80 and a stop plate 173 mounted on the inside surface of the vertical beam 80. The threaded rod 170 is normally urged to the left as shown in FIG. 2 due to the tension in the drive loop 114. After the threaded rod 170 is adjusted by slidably moving the slide member 164 between the side plates 163 a threaded collar member 174 is tightened against the stop plate 173 to prevent further movement of the threaded bar 170 to the left. In this way tension in the drive loop 114 may be adjusted.

Referring again to FIG. 1, on a pair of spaced rails 176 on opposite sides of the quench unit 24 are mounted a pair of carriers 178 for movement in line with the direction of glass conveyance within the furnace 22. While not shown, each carrier 178 includes crossing straps on which one or more molds in the form of carrier rings are supported for movement between the furnace 22 and the quench unit 24. During use the carrier 178 moves the various mold rings beneath the holder 64 as shown by the solid lines in FIG. 1 which has one or more heated sheets of glass supported on its lower planar surface. Vacuum supply to the holder 64 is then terminated so that the heated glass sheets drop down onto the mold rings in the furnace heating chamber 42. Due to its heated condition the planar sheets of glass begin to sag under the bias of gravity so as to assume the curved shape of their respective rings. The glass sags a certain extent without oversagging for a period of time dependent upon the particular configuration to which the glass is to be bent. During this time the holder 64 is moved to its upstream position in preparation for removing another set of glass sheets from the conveyor rolls 46.

After dwelling within the furnace 22 the carriers 178 move from the furnace heating chamber 42 to the quench unit 24 and position the bent sheets of glass between upper and lower blastheads 180 and 182, respectively, of the quench unit 24. Each of these blastheads is preferably of the type disclosed in U.S. Pat. No. 3,936,291, the entire disclosure of which is hereby incorporated by reference.

The air supply supplied through the blastheads 180 and 182 accurately cools the glass surface to temper the glass and thereby increases its mechanical strength. Thereafter the air is only supplied through the lower blasthead 182 which impinges upon the lower surface of the bent and tempered glass sheets and lifts the glass sheets upwardly off the mold rings to enable the carrier 178 to move back into the furnace 22 to pick up another set of glass sheets for another cycle. A cooler, such as a cooler 184, as seen in FIG. 1, can also be included to cool the glass to room temperature before conveyance to an operator.

Actuators for moving the carrier 178 are embodied in a pair of continuous drive chains, only one of which is shown at 186. The drive chains are located on opposite sides of the quench unit 24 and are secured to the carrier 178. Pulleys comprising chain sprockets 188 have the chains 186 trained over them. A pair of the sprockets interconnected by a hollow cross shaft sleeve (not shown) couple the chains 186 for operation with each other. In turn, a servo motor (not shown) is provided to move the carrier 178 through the chain. Accurate control of the acceleration and deceleration of the carrier 178 is possible with a servo motor drive circuit (not shown) to prevent the glass from being marred by sliding on the rings as the carrier 178 starts and stops.

The manner in which the holder 64 accepts the heated glass from the conveyor 44 as the glass moves horizontally in the furnace 22 and maintains the glass planar prior to dropping the glass onto the mold rings for bending under gravity gives great production flexibility for bending and tempering glass of different sizes and shapes. Any size of glass can be bent and tempered on the apparatus without changing the vacuum holder 64 due to the planar shape of its bottom surface 66. Only the shape and size of each of the mold rings must be changed for bending and tempering glass sheets of different sizes and shapes. Also, due to the horizontal movement of the holder 64 there is no need to provide quench units on both sides of the furnace 22 for tempering to increase production output.

A control system such as the control system provided in U.S. Pat. No. 4,282,026 may be provided to allow the controller 152 to control pick-up of the glass sheets from the conveyor rolls 46 so that glass can be picked up off the conveyor without first stopping its movement while always properly locating the glass longitudinally along the direction of conveyance with respect to the mold ring.

While the best mode for practicing the invention has been described in detail, those skilled in this art will recognize various alternative designs and embodiments for practicing the present invention as defined by the following claims.

What is claimed is:
1. Apparatus for bending glass sheets comprising:
   a furnace for providing a heated ambient for heating glass sheets to a sufficiently high temperature for bending thereof;

a conveyor for conveying glass sheets through the heated ambient;

a holder having a downwardly facing planar surface spaced immediately above the conveyor in close proximity to a heated glass sheet conveyed under the holder;

means for applying a differential gas pressure to said heated glass sheet to provide support thereof against the holder surface;

a curved mold movable into the heated ambient to a first position at an elevation below the holder surface and thereafter movable to a second position out of the heated ambient;

means for horizontally moving the holder within the heated ambient from above the conveyor to above the mold while the mold is in the first position whereupon the differential gas pressure is terminated to release the heated glass sheet onto the mold for bending by gravity;

an actuator for moving the mold with the glass sheet thereon from the first position to the second position for cooling; and control means for coordinating the holder moving means and the conveyor to synchronize horizontal movement of the holder within the heated ambient with the movement of the conveyed heated glass sheets.

2. Apparatus as in claim 1 further including a quench unit for tempering the bent glass sheets.

3. The apparatus as claimed in claim 1 or claim 2 including a carriage for supporting the holder in the heated ambient.

4. Apparatus as claimed in claim 3 wherein the means for horizontally moving the holder includes a drive mechanism including at least one continuous drive loop connected to the carriage.

5. Apparatus as claimed in claim 4 wherein the drive mechanism includes a pair of spaced continuous drive loops disposed outside the furnace, and a pair of drive members respectively connecting the pair of drive loops to the carriage.

6. Apparatus as claimed in claim 5 wherein the carriage includes side supports which rest upon the pair of continuous drive loops.

7. Apparatus as claimed in claim 6 further including horizontal tracks on which the drive loops are supported and driven.

8. Apparatus as claimed in claim 7 wherein the side supports include an adjustment mechanism adjusting the spacing between the downwardly facing holder surface and the conveyor.

9. Apparatus as claimed in claim 8 wherein the continuous drive loops comprise chains and the drive mechanism further includes idler and drive sprockets that respectively support and drive the chains.

10. Apparatus as claimed in claim 9 including a chain adjustment mechanism for adjusting the tension in the chains.

11. Apparatus as claimed in claim 10 wherein said chain adjustment mechanism includes a slide mechanism for slidably adjusting the position of one of said idler sprockets.

12. Apparatus as clamed in claim 1 or 2 wherein the mold includes a generally open center.

13. Apparatus as claimed in claim 1 or claim 2 further including a mold carrier and a plurality of molds supported thereby and adapted to receive a plurality of glass sheets from the holder for bending.

14. Apparatus as claimed in claim 13 wherein each mold includes a generally open center.

15. Apparatus as claimed in claim 1 or 2 wherein there is substantially no relative horizontal movement between the holder and heated glass sheet as the glass sheet is received by the holder from the conveyor.

* * * * *